United States Patent [19]
Mounts

[11] 3,993,346
[45] Nov. 23, 1976

[54] REAR WALL STRUCTURE FOR A VEHICLE CAB

[75] Inventor: William T. Mounts, Chillicothe, Ill.

[73] Assignee: Caterpillar Tractor Co., Peoria, Ill.

[22] Filed: May 27, 1975

[21] Appl. No.: 581,296

[52] U.S. Cl. .............................. 296/84 N; 49/164; 180/77 S
[51] Int. Cl.² ......................................... B60J 1/20
[58] Field of Search ................ 296/28 C, 84 N, 56, 296/84 R; 49/164, 165, 196; 180/77 S

[56] References Cited
UNITED STATES PATENTS

| | | | |
|---|---|---|---|
| 2,583,918 | 1/1952 | Wilson | 296/28 C |
| 2,660,274 | 11/1953 | Donathan | 49/164 |
| 3,054,118 | 9/1962 | Bullock | 49/165 |
| 3,831,699 | 8/1974 | Wolter | 180/77 S |

Primary Examiner—Robert R. Song
Attorney, Agent, or Firm—Wegner, Stellman, McCord, Wiles & Wood

[57] ABSTRACT

A rear wall structure for a cab of a vehicle such as a tractor is particularly applicable to units which have a front mounted implement, such as a loader bucket and a rear implement such as a backhoe which is a removable attachment that has self-contained controls on a platform secured behind the cab. The cab has a reversible seat so the operator may face either implement. The wall structure includes a double-hung window in which the lower window raises on guide tracks on the frame of the upper window; and in which, after the lower window is raised and secured, both windows may be swung out to provide a canopy above the backhoe controls. A lower wall panel is hinged at the bottom to swing inwardly so the operator may rest his feet on the platform.

18 Claims, 4 Drawing Figures

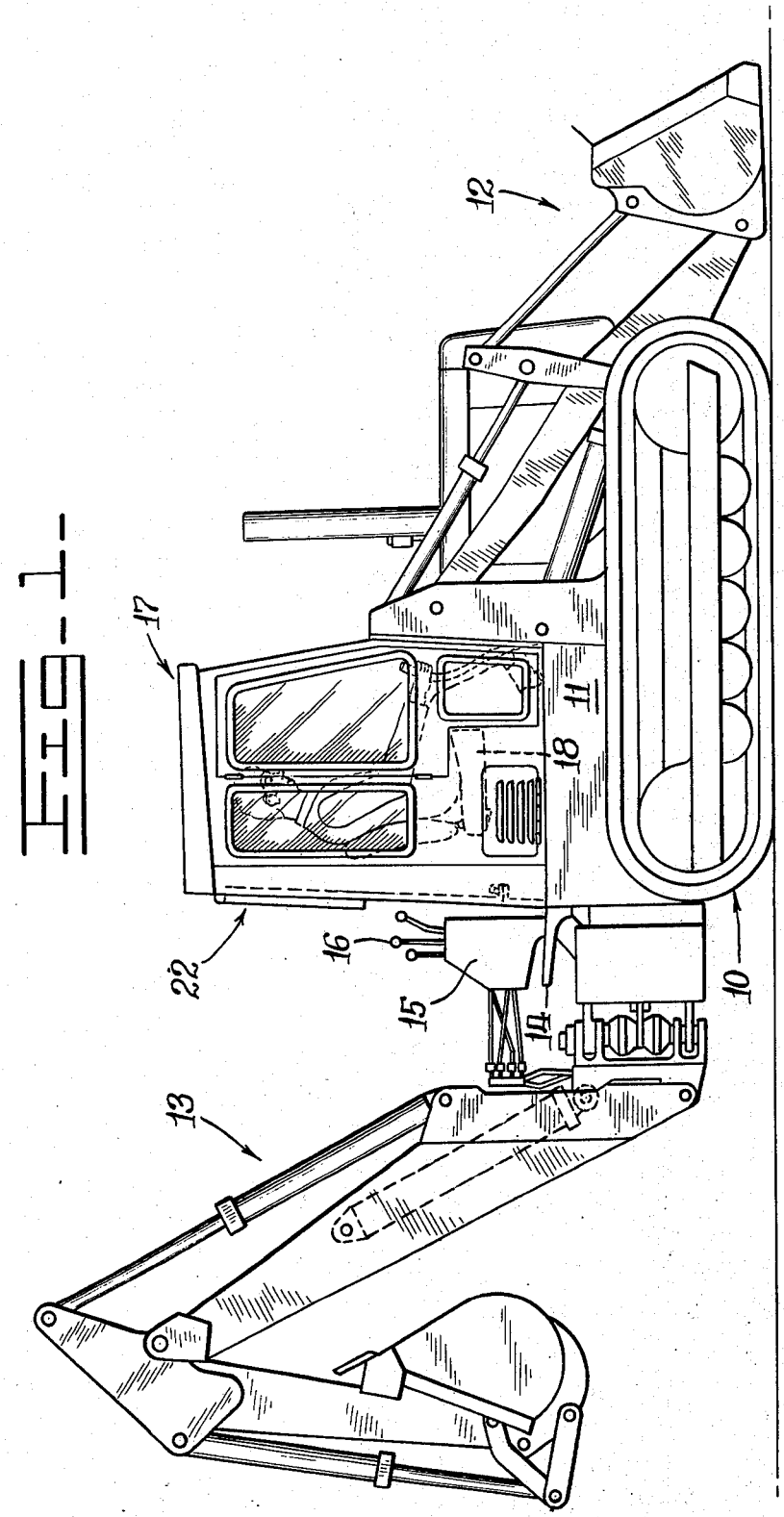

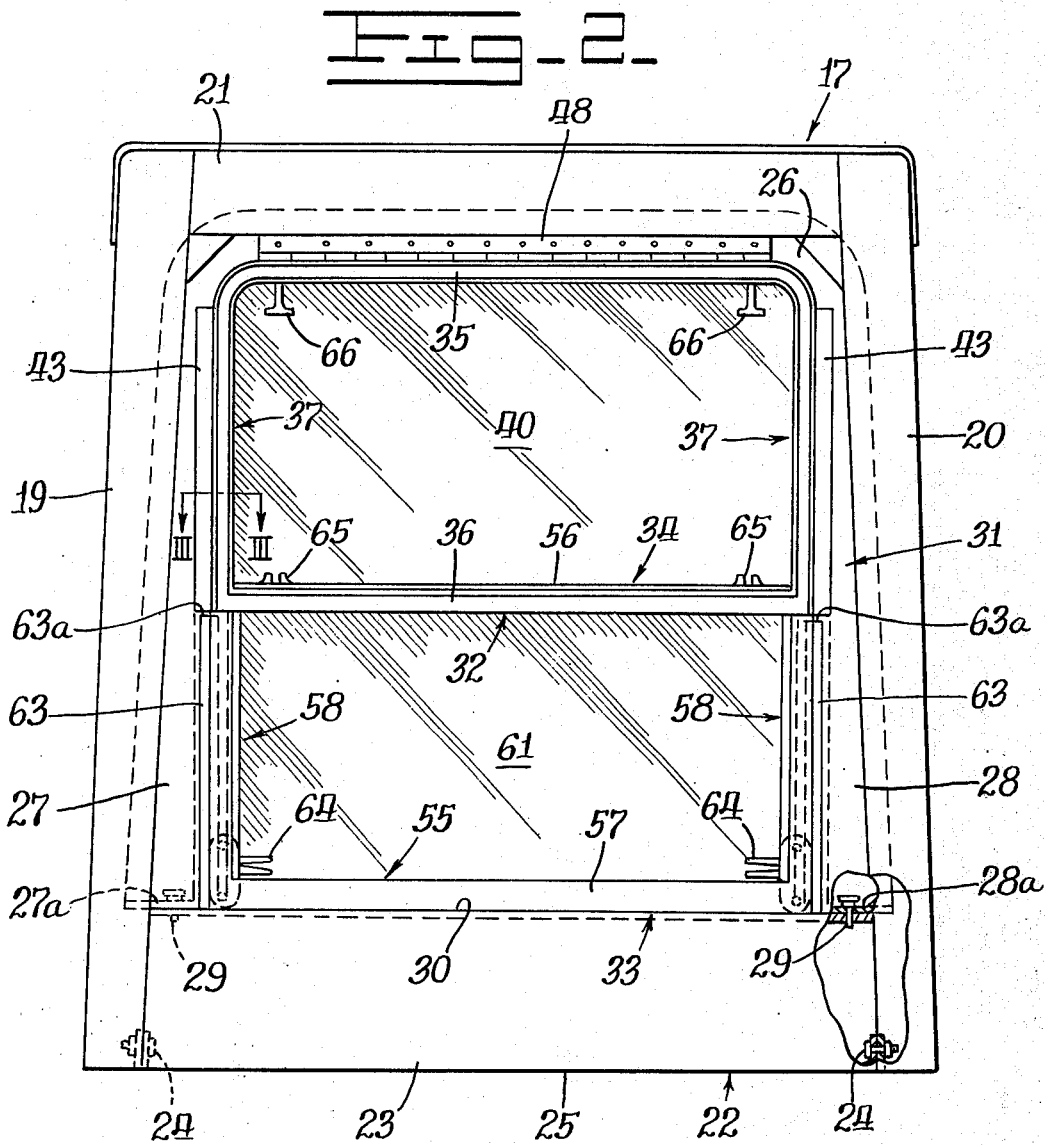
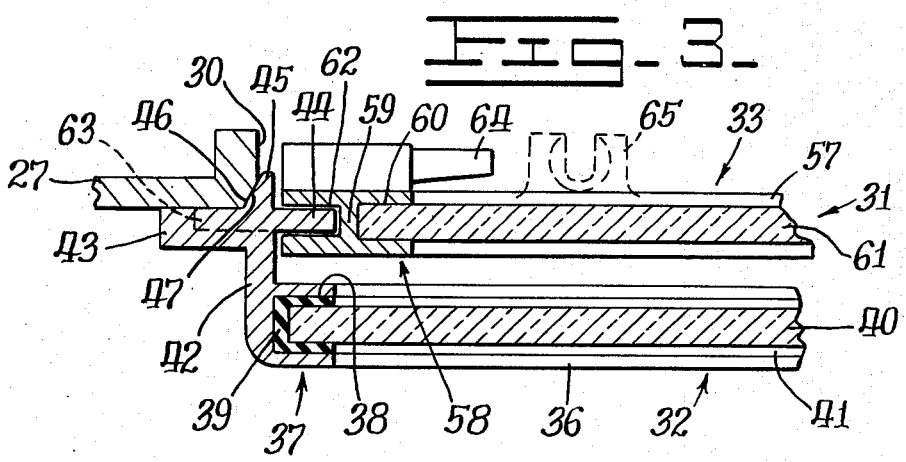

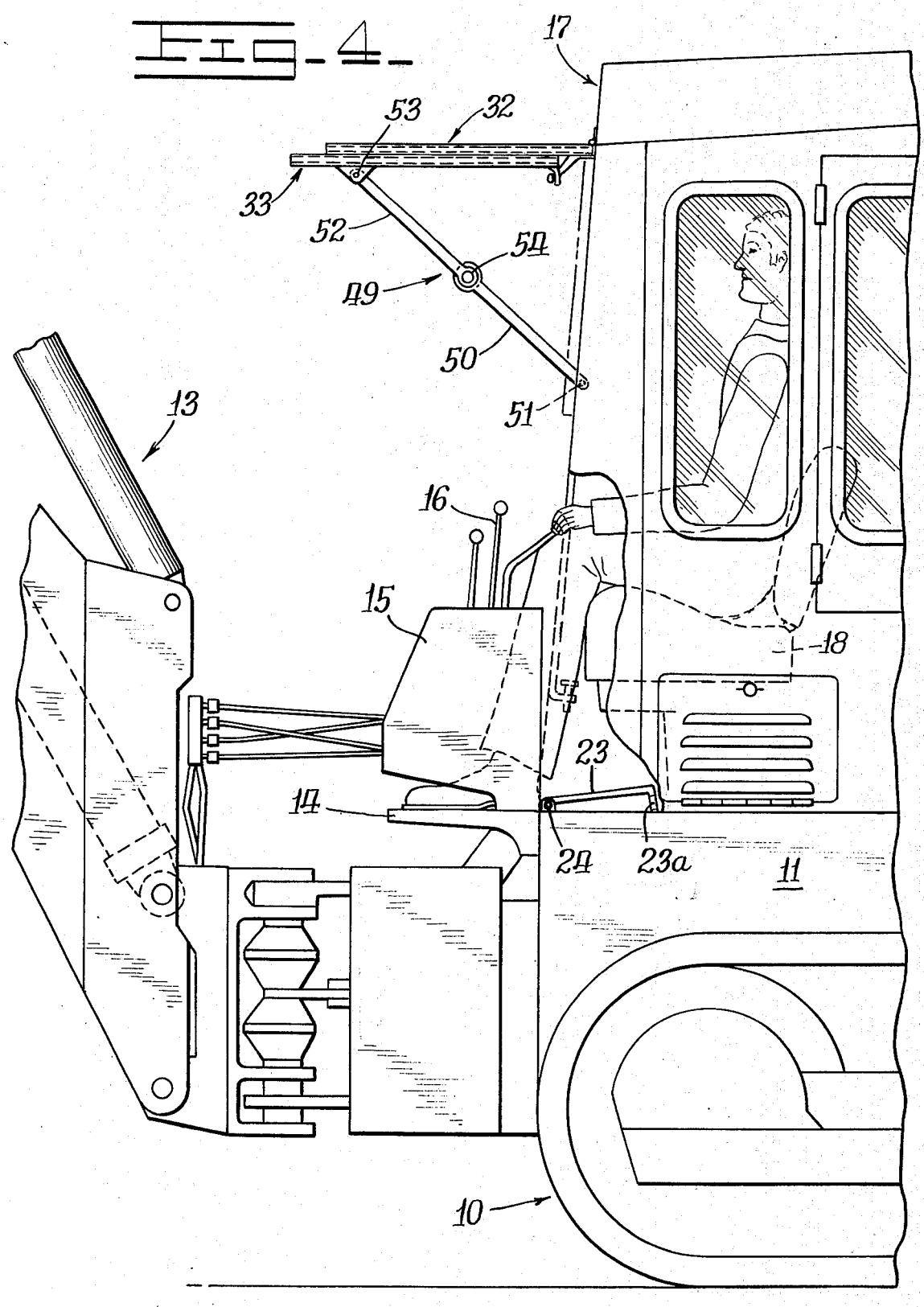

REAR WALL STRUCTURE FOR A VEHICLE CAB

BACKGROUND OF THE INVENTION

As the cost of heavy equipment such as wheel loaders and track loaders increase, it becomes more and more desirable to provide such units which may also carry a rear-mounted implement such as a backhoe. In order for the operator to run the backhoe efficiently, he must be able to sit facing it, so such vehicles are provided with a reversible seat.

However, because of the dusty conditions and bad weather in which such vehicles must often be used, it is also desirable that the vehicle be provided with a cab. This presents a serious problem in a dual purpose vehicle such as a track loader provided with a rear-mounted backhoe, because the backhoe is a removable attachment which is hung on the rear of the vehicle frame and has its self-contained controls on its own platform which must, therefore, be outside the vehicle cab.

Accordingly, dual purpose vehicles of the type above described, if they are provided with a cab, must have a rear cab wall structure which permits the operator to have access to the rear implement controls. Further, since such a cab is mounted at the extreme rear of the vehicle frame, and the seat is near the rear of the cab, the operator has no leg room when the seat is reversed unless the rear wall of the cab is designed to meet the problem.

SUMMARY OF THE INVENTION

In accordance with the present invention, a cab for a vehicle which has a front-mounted implement and a rear-mounted implement with controls behind the cab is provided with a specialized rear wall structure which affords ready access to the controls for the rear implement.

The wall structure includes a transverse lower wall panel, a transverse header panel, and upright side wall panels which define a window frame. The space between the lower wall panel and the header panel is occupied by a double-hung window.

The lower window may be raised and lowered upon guides which are integral with the upright side wall panels but which terminate below the upper window, and upon cooperating guide rails which are integral with the frame of the upper window. Thus, when the lower window is raised and secured in its raised position, it is carried entirely upon the frame of the upper window.

The upper window is hinged on the header so that it may be swung outwardly after the lower window is in its raised position, and means are provided for fastening the outwardly swung windows so that they may serve as a canopy above the control platform for the rear implement.

In addition, the lower wall panel may be swung inwardly onto the floor beneath the reversed seat so that the operator may sit comfortably with his feed on the platform at the two sides of the controls.

Although the wall structure has its principle application in dual purpose vehicles as above described, it is quite apparent that the double-hung window may also be swung outwardly is applicable to any tractor cab to provide a rear window structure that permits the operator to open the entire back of the cab in good weather if he so desires.

The principle object of the invention, therefore, is to provide an improved wall structure of a cab of a vehicle which has a front-mounted implement, a rear-mounted implement, and a reversible seat which permits the operator to face either implement.

Another object of the invention is to provide a back window structure for a cab of a tractor or the like.

THE DRAWINGS

FIG. 1 is a side elevational view of a track loader having a cab which is provided with the rear wall of the present invention, there being a backhoe mounted on the rear of the track loader as an attachment, FIG. 2 is an outside elevational view of the rear wall structure of the invention;

FIG. 3 is a fragmentary transverse section on an enlarged scale taken substantially as indicated along the line III—III of FIG. 2; and FIG. 4. is a fragmentary side elevational view of the track loader with the rear wall open and the operator facing the backhoe.

DETAILED DESCRIPTION OF THE INVENTION

Referring to FIG. 1, a crawler tractor, indicated generally at 10, includes a frame 11; and mounted at the front of the frame is a loader bucket structure 12. A backhoe attachment, indicated generally at 13, is detachably mounted upon the rear of the tractor frame 11 and includes a platform 14 having a shield 15, and backhoe controls 16 extend upwardly from the platform 14 between the sides of the shield. A cab, indicated generally at 17, is mounted on the tractor frame 11; and as indicated by a comparison of FIG. 1 with FIG. 4, in the cab is an operator's seat 18 which is reversible so that the operator may face either the front-mounted implement 12 or the rear-mounted implement 13.

The rear of the cab consists of upright side plates 19 and 20, the upper ends of which are connected by a transverse top plate 21; and secured to said side plates and top plate is a rear wall structure, indicated generally at 22, which is the subject of the present invention.

The rear wall structure 22 includes a normally upstanding transverse lower wall panel 23 which has pivots 24 near its lower edge 25 by means of which it is mounted upon the side plates 19 and 20 for inward swinging movement as illustrated in FIG. 4. The rear wall structure also includes a transverse header panel 26 and upright side wall panels 27 and 28 which are permanently mounted on the inner faces of the side plates 19 and 20 and the transverse top plate 21. The upright side wall panels 27 and 28 have horizontal flanges 27a and 28a at their lower ends which carry spring loaded pins 29 that impale said flanges and extend through holes in a forwardly extending top web 23a of the lower wall panel 23 to releasably lock said lower panel in its normal upstanding position.

The lower wall panel 23, the header panel 26 and the upright side wall panels 27 and 28 define a window opening 30 in which is mounted a double-hung window structure, indicated generally at 31.

The double-hung window structure 31 includes an upper window, indicated generally at 32, which normally occupies the top half of the window opening 30; and a lower window indicated generally at 33, which normally occupies the bottom half of said window opening.

The upper window 32 includes an upper frame, indicated generally at 34, which consists of a top cross member 35, a bottom cross member 36, and upright side members which are indicated generally at 37. As seen in FIG. 2, the top cross member 35 and the upright side members 37 are integrally formed and have a continous internal channel 38 (FIG. 3) which receives an inwardly open U-shaped gasket 39; and a transparent window panel 40 is mounted in the gasket. The bottom cross member 36 has a channel in its upper surface that carries an upwardly open U-shaped gasket 41 in which the transparent panel 40 is seated. The bottom cross member 36 is detachably secured to the lower ends of the upright side members 37 so that, if a panel 40 is broken it is only necessary to remove the bottom cross member 36, slip the broken panel 40 out of the gasket 38, insert a new panel 40 in the gasket, and remount the bottom cross member 36.

Referring now to FIG. 3, the upright side members 37 are seen to include webs 42 that extend forwardly from the plane of the transparent panel 40 and have exterior flanges 43 which abut the outer faces of the side wall panels 27 and 28 when the upper window is closed. Extending laterally inwardly from the flanges 43 are guide rails 44 which guide the raising and lowering of the lower window 33 as will be described hereinafter. The webs 42 have formed extremities 45 forward of the flanges 43, and said forward extremities have inwardly converging external surfaces 46 that co-act with complementary internal surfaces 47 on the side wall panels 27 and 28.

A piano hinge 48 mounts the upper window 32 for rearward swinging movement on the header 26. The upper window 32 may be swung out to the position illustrated in FIG. 4 only after the lower window 33 is raised, as will be described. Toggle linkages at the two sides of the window structure, indicated generally at 49, are designed to retain the windows in the position of FIG. 4 where they form a canopy above the platform 14, or at any partially elevated position desired by the operator. Each of the toggle linkages 49 includes a first link 50 which is provided at 51 on a boss on one of the side wall panels 27 or 28, a link 52 which is pivoted at 53 on a boss on the lower window frame member 37, and a pivotal connection 54 between the links 50 and 52 which includes conventional locking means such as a fixed threaded stud on the pivot axis and a large hand nut screwed onto the stud.

Referring again to FIGS. 2 and 3, the lower window 33 includes a lower frame, indicated generally at 55, which consists of a top cross bar 56, a bottom cross bar 57, and upright side bars, indicated generally at 58. As seen in FIG. 3, each of the side bars 58 is H-shaped in cross-section, consisting of a central web 59, an internal channel 60 to receive a lower transparent window panel 61, and an external guide channel 62 which slides upon the guide rails 44 of the upper window frame side members 37. The lower window 33 is also guided by guide bars 63 which are secured to outer faces of the upright side wall panels 27 and 28 and project inwardly into vertical alignment with the guide rails 44 of the upper window frame so that the guide channel 62 of the lower window frame are guided both by the lower guide bars 63 and by the guide rails 44 of the upper window. The lower guide bars 63 are seen in FIG. 2 to have their upper ends 63a below the bottom cross member 36 of the upper window 32, and when the lower window 33 is fully raised its bottom cross bar 57 clears the upper ends 63a of the guide bars 63 to permit the windows to be swung outwardly as seen in FIG. 4.

The lower window 33 has conventional manually releasable locks 64 which lock it in its normal position. There are also means for securing the lower window in its raised position, such means comprising brackets 65 which project forwardly from the lower window top bar 56, and elastic coupling member 66 on the top cross member 35 of the upper window frame. The elastic couplings 66 are seen to be generally of an inverted T-shape so that their heads may engage beneath the bracket 65 with the shanks of the Ts extending through slots in the brackets.

The bracket 65 in FIG. 3 is illustrated in broken lines, of course, because it and supporting cross bar 56 have been deleted by the sectioning of window 33 in FIG. 3.

The foregoing detailed description is given for clearness of understanding only and no unnecessary limitations should be understood therefrom as modifications will be obvious to those skilled in the art.

I claim:

1. In a cab for a vehicle, a rear wall structure comprising, in combination:

an upstanding transverse lower wall panel, a transverse header panel, and upright side wall panels defining a window opening;

an upper window normally occupying the top half of said window opening, said upper window including an upper frame having top and bottom cross members and upright side members, a transparent panel fixedly mounted in said upper frame, and guide rails integral with said side members;

a lower window normally occupying the bottom half of said window opening, said lower window including a lower frame having top and bottom cross bars and upright side bars, a transparent panel fixedly mounted in said lower frame, and guide channels integral with said side bars which slide on said guide rails as said lower window is moved between a normal position surmounting the lower wall panel and a raised position facing said upper window;

upright guide means secured to the side wall panels for guiding said lower window as it is moved between said positions, said guide means terminating below the bottom cross member of the upper window;

means for securing the lower window in its raised position;

hinge means securing the top cross member of the upper window to the header panel for outward swinging movement of said windows to a canopy position when the lower window is in its raised position;

and means for securing said windows in said canopy position.

2. The combination of claim 1 in which the upright guide means are rails with which the guide rails on the upper window side members are aligned when the upper window is closed.

3. The combination of claim 1 in which the side members of the upper window frame include exterior flanges which abut the outer faces of the side wall panels when the upper window is closed.

4. The combination of claim 3 in which the side members of the upper window frame have webs that extend forwardly from the plane of the transparent panel, the flanges extend laterally outwardly from the forward portions of said webs, and the guide rails extend laterally inwardly from said forward portions.

5. The combination of claim 4 in which the webs have their forward extremities forward of the flanges and the guide rails, and said forward extremities have inwardly converging external surfaces that coact with complementary internal surfaces on the side wall panels.

6. The combination of claim 1 that includes manually releasable means for locking the lower window in its normal position.

7. The combination of claim 1 in which the means for securing the lower window in its raised position comprises brackets on the top cross bar of said window and elastic coupling members on the top cross member of the upper window frame engageable with said brackets.

8. The combination of claim 1 in which the means for securing the windows in canopy position comprises arms pivotally connected end-to-end, one of said arms being pivoted on a side of the cab and the other of said arms being pivoted on a side member of the upper window frame, and releasable locking means at the pivoted connection between said arms.

9. In a cab for a vehicle that has implements at the front and rear, a reversible seat in the cab so that an operator may face either implement, and control means for the rear implement which is outside the rear of the cab, a rear wall structure for said cab, said rear wall structure comprising, in combination:
   an upstanding transverse lower wall panel, a transverse header panel, and upright side wall panels defining a window opening;
   an upper window normally occupying the top half of said window opening, said upper window including an upper frame having top and bottom cross members and upright side members, a transparent panel fixedly mounted in said upper frame, and guide rails integral with said side members;
   a lower window normally occupying the bottom half of said window opening, said lower window including a lower frame having top and bottom cross bars and upright side bars, a transparent panel fixedly mounted in said lower frame, and guide channels integral with said side bars which slide on said guide rails as said lower window is moved between a normal position surmounting the lower wall panel and a raised position facing said upper window;
   upright guide means secured to the side wall panels for guiding said lower window as it is moved between said positions, said guide means terminating below the bottom cross member of the upper window;
   means for securing the lower window in its raised position;
   hinge means securing the top cross member of the upper window to the header panel for outward swinging movement of said windows to a canopy position when the lower window is in its raised position;
   and means for securing said windows in said canopy position.

10. The combination of claim 9 which includes pivot means mounting the lower wall panel for inward swinging movement about its lower edge portion to permit an operator to sit with his legs outside the cab when he faces the rear implement, and manually releasable means for locking said lower wall panel in its upstanding position.

11. A window structure for a vehicle cab that has a wall with an outside surface and an inside surface, said wall being provided with a rectangular window opening having four margins, said window structure comprising, in combination:
   a first window normally closing one-half of said window opening, said first window including a rectangular first frame having four connected first frame members, a transparent panel fixedly mounted in said first frame, and first parallel guide means integral with and extending lengthwise of two opposite first frame members, said two opposite frame members having webs which extend into and co-act with complementary surfaces on opposite margins of the window opening;
   a second window normally closing the other half of said window opening, said second window including a rectangular second frame having four connected second frame members, a transparent panel fixedly mounted in said second frame, and second parallel guide means integral with and extending lengthwise of two opposite second frame members, said second parallel guide means consisting of outwardly open channels each of which is adapted to embrace one of said first parallel guide means, and said second parallel guide means being aligned with and slidingly embracing said first parallel guide means as said second window is moved between its normal position and an open position facing said second window;
   third parallel guide means on opposite margins of the window opening in longitudinal alignment with the first parallel guide means and each consisting of a single rail embraced by a channel of the second parallel guide means for also guiding said second window as it is moved between said positions, said first and third parallel guide means having spaced adjacent ends;
   and hinge means mounting the first window on a margin of the window opening for outward swinging movement of said windows when the second window is in its open position.

12. The combination of claim 11 in which the hinge means mounts the first window on a margin of the window opening which is between the margins having the third parallel guide means.

13. The combination of claim 11 in which the first and third parallel guide means are upright.

14. The combination of claim 13 in which the hinge means is at a top margin of the window opening.

15. The combination of claim 11 in which the two opposite first frame members have flanges which overlie the outside wall surface adjacent said opposite margins of the window opening.

16. The combination of claim 11 in which the hinge means is at a top margin of the window opening.

17. A window structure for a vehicle cab that has a wall provided with a rectangular window opening having four margins, said window structure comprising, in combination:
   a first window normally closing one-half of said window opening, said first window including a rectangular first frame having four connected first frame members, a transparent panel fixedly mounted in said first frame, and first parallel guide means integral with and extending lengthwise of two upright first frame members;

a second window normally closing the other half of said window opening, said second window including a rectangular second frame having four connected second frame members, a transparent panel fixedly mounted in said second frame, and second parallel guide means with and extending lengthwise of two upright second frame members, said second parallel guide means being aligned with and slidingly engaging said first parallel guide means as said second window is moved between its normal position and an open position facing said second window;

third parallel guide means on upright margins of the window opening in longitudinal alignment with the first parallel guide means for also guiding said second window as it is moved between said positions, said first and third parallel guide means having spaced adjacent ends;

hinge means mounting the first window on the top margin of the window opening for outward swinging movement of said windows when the second window is in its open position, whereby said two windows provide a canopy above the window opening;

and means for securing said windows in said position serving as a canopy.

18. A window structure for a vehicle cab that has a wall with an outside surface and an inside surface, said wall being provided with a rectangular window opening having four margins, said window structure comprising, in combination:

a plurality of windows each of which normally closes a predetermined part of said window opening extending the full width of the opening between two opposite margins thereof, said windows collectively closing said opening, there being, an outer first window which has a rectangular first frame having four connected first frame members, a transparent panel fixedly mounted in said first frame, webs on opposite ones of said first frame members which seal against said two opposite margins, and first parallel guide means integral with and extending lengthwise of said opposite ones of said first frame members inward of said webs, an inner second window including a rectangular second frame having four connected second frame members in the plane of said first parallel guide means, a transparent panel fixedly mounted in said second frame, and second parallel guide means integral with and extending lengthwise of two opposite second frame members, said second parallel guide means slidably engaging said first parallel guide means so that said second frame moves on said first frame between its normal position and an open position facing said first frame;

third parallel guide means on said two opposite margins of the window opening in longitudinal alignment with the first guide means so the inner window is guided thereon in its normal position;

and hinge means mounting the outer window for outward swinging movement of the two windows on a margin of the window opening between said two opposite margins when the inner window is in its open position.

* * * * *